Figure 1:
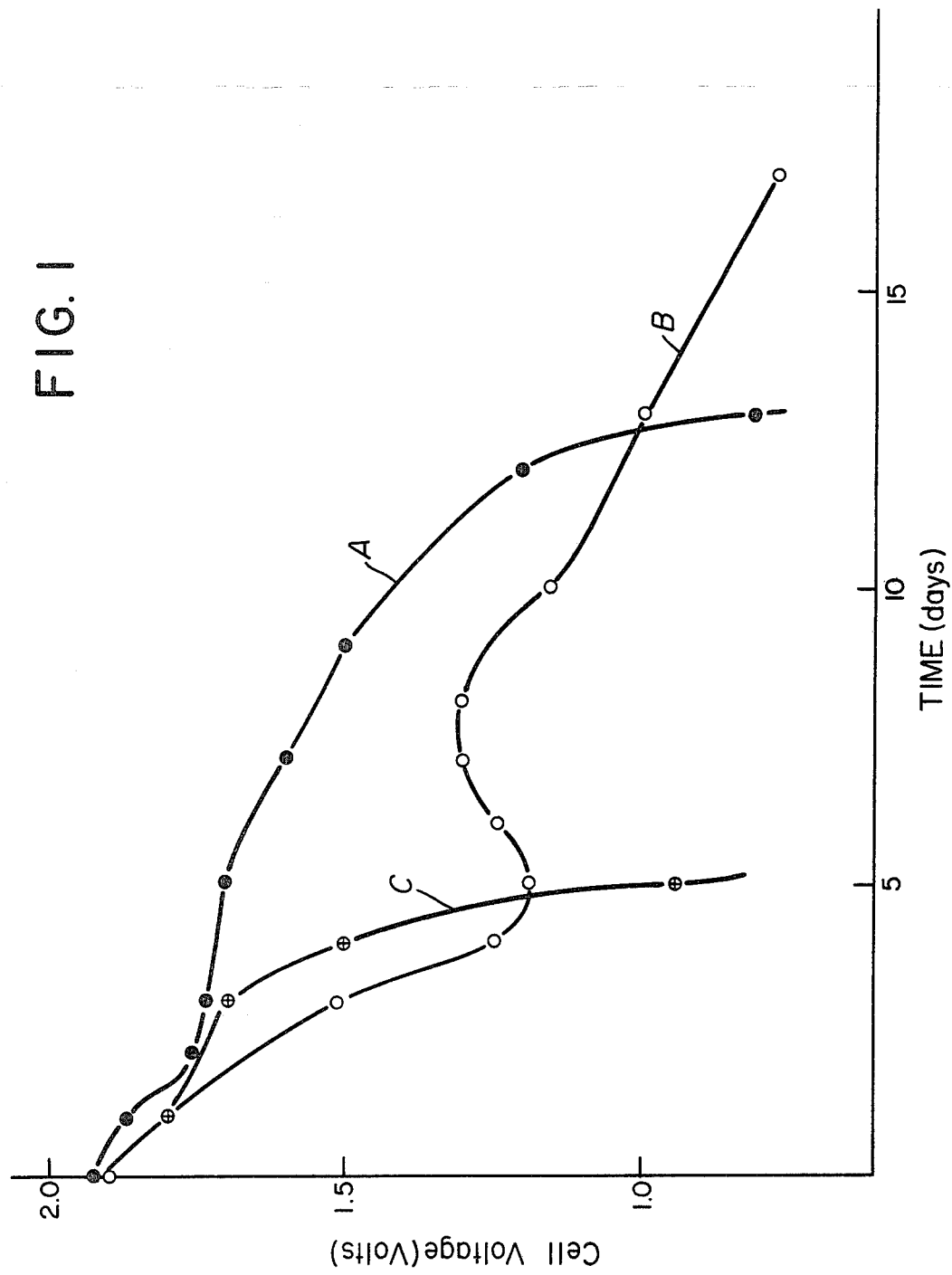

United States Patent [19]

Mellors

[11] 4,218,527
[45] Aug. 19, 1980

[54] LEAD DIOXIDE/FLUORIDE-CONTAINING CATHODES FOR SOLID ELECTROLYTE CELLS

[75] Inventor: Geoffrey W. Mellors, North Royalton, Ohio

[73] Assignee: Union Carbide Corporation, New York, N.Y.

[21] Appl. No.: 25,588

[22] Filed: Mar. 30, 1979

[51] Int. Cl.² .............................................. H01M 6/18
[52] U.S. Cl. .................................. 429/191; 252/182.1; 429/225
[58] Field of Search ...................... 429/228, 191, 225; 252/182.1

[56] References Cited

U.S. PATENT DOCUMENTS

| | | |
|---|---|---|
| 3,455,742 | 7/1969 | Rao . |
| 3,709,734 | 1/1973 | Liang et al. . |
| 3,778,310 | 12/1973 | Garth . |
| 3,973,990 | 8/1976 | Borger et al. . |
| 4,071,655 | 1/1978 | Garth . |
| 4,079,174 | 3/1978 | Beck et al. ............................ 429/228 |

OTHER PUBLICATIONS

The Preparation of Lead Dioxide for X-Ray Diffraction Studies by N. E. Bayshaw et al., J. Appl. Chem., 1966, vol. 16, Jun.
The Intermediate Oxides of Lead by J. S. Anderson et al., J. Inorg. Nucl. Chem., 1959, vol. 11, pp. 272 to 285.

*Primary Examiner*—Donald L. Walton
*Attorney, Agent, or Firm*—Cornelius F. O'Brien

[57] ABSTRACT

A cathode for use in solid electrolyte cells comprising a mixture of water-containing lead dioxide and a metal fluoride.

13 Claims, 3 Drawing Figures

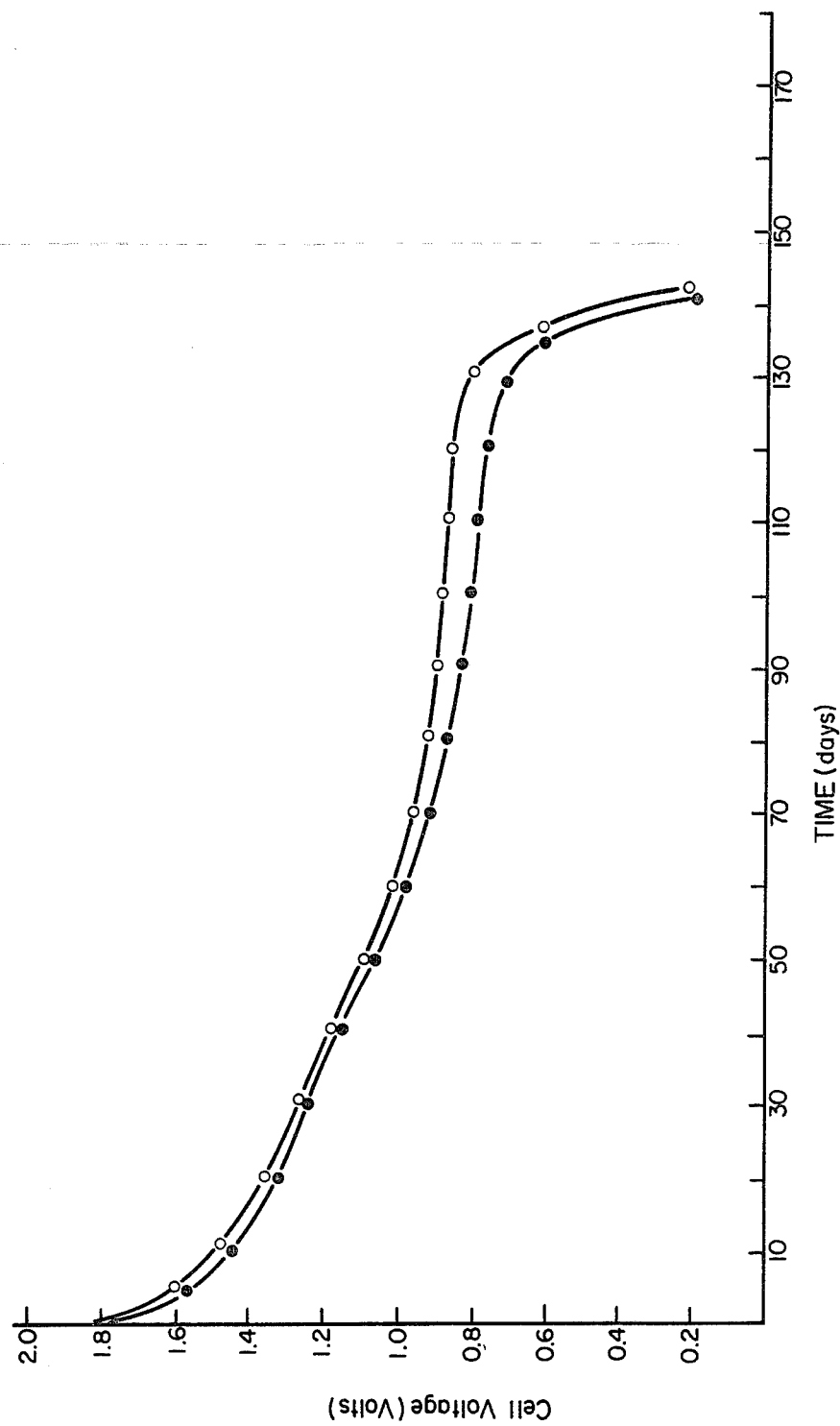

LEAD DIOXIDE/FLUORIDE-CONTAINING CATHODES FOR SOLID ELECTROLYTE CELLS

FIELD OF THE INVENTION

The invention relates to a cathode for use in solid state electrolyte cell systems in which the cathode comprises a mixture of lead dioxide with a metal fluoride.

BACKGROUND OF THE INVENTION

Ionic conductivity is usually associated with the flow of ions through an aqueous solution of metallic salts. In the vast majority of practical uses of ionic conductors, e.g., as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have ionic conductances approaching those exhibited by the commonly used liquid systems. Such compounds have specific conductances at room temperature (20° C.) in the range of $10^{-6}$ to $10^{-15}$ ohm$^{-1}$ cm.$^{-1}$ as compared to aqueous solutions of salts which typically have a specific conductance of 0.5 to 0.05 ohm$^{-1}$ cm$^{-1}$.

Improved microelectronic circuit designs have generally decreased the current requirements for electronic devices. This in turn has enhanced the applicability of solid electrolyte power sources which usually can only deliver currents in the microampere range. These solid electrolyte systems have the inherent advantages of being free of electrolyte leakage and internal gassing problems due to the absence of a liquid phase and corrosion phenomena. In addition, they also have a much longer shelf life than the conventional liquid electrolyte power sources.

Solid electrolytes must be essentially electronic insulators so as not to internally short the cell while at the same time they must allow ionic movement in the crystal lattice for the cell to operate. It has been discovered that certain metallic salts which are solids at room temperatures have ionic conductances sufficiently high to permit their use in practical battery applications. For example, U.S. Pat. No. 3,723,185 discloses solid state electrolytes of compounds conforming to the general formula AgI-MCN-AgCN or modifications thereof wherein M is potassium, rubidium, cesium or mixtures thereof.

U.S. application Ser. No. 973,554 filed Dec. 27, 1978 titled Solid State Electrolyte, discloses a relatively highly conducting solid state electrolyte made from a binary mixture of lead fluoride and a 0.1 to 15.0 mole percent of a selected alkali salt of sodium, potassium, rubidium and cesium. U.S. application Ser. No. 973,552 filed Dec. 27, 1978 titled Solid State Electrolytes discloses a relatively highly conducting solid state electrolyte of a product of a fused ternary mixture of lead fluoride, an alkali salt of sodium, potassium, rubidium or cesium in a range of 0.1 to 15.0 mole percent and a fluoride, nitrate or sulfate of magnesium, calcium, strontium or barium in a range of between 1 and 40 mole percent. Both of these U.S. applications are incorporated herein by reference.

Although various solid cathode materials are recited in the art for use in various cell systems, an object of the present invention is to provide a novel cathode for use in solid electrolyte cell systems employing solid electrolytes such as those disclosed in the above-identified U.S. patent applications Ser. Nos. 973,552 and 973,554.

Another object of the present invention is to provide a solid cathode for use with a solid fluoride-containing electrolyte wherein said cathode comprises a mixture of lead dioxide and a metal fluoride.

Another object of the present invention is to provide a cathode consisting essentially of lead dioxide and a metal fluoride for use in a lead fluoride-containing solid electrolyte system, and wherein the open circuit voltage of the system is higher than the open circuit voltage obtained using either lead dioxide or a metal fluoride alone as the cathode in the system.

Another object of the present invention is to provide a cathode consisting of lead dioxide and a metal fluoride for use in a solid electrolyte cell employing a lead anode and a lead fluoride-based solid electrolyte as disclosed in U.S. applications Ser. Nos. 973,552 and 973,554.

Another object of the present invention is to provide a cathode consisting of a mixture of lead dioxide and a metal fluoride in a mole ratio of between about 3:1 and about 1:3.

The foregoing and additional objects will become more fully apparent from the following description.

SUMMARY OF THE INVENTION

The invention relates to a cathode for use in an electrochemical cell comprising a mixture of lead dioxide ($PbO_2$) having a water content of between about 0.4 and about 10 weight percent with at least one metal fluoride in a mole ratio of between about 3:1 and about 1:3, preferably about 1:1. The metal fluoride can be selected from the group consisting of cobaltic trifluoride ($CoF_3$), lead trifluoride ($PbF_3$), manganese trifluoride ($MnF_3$), tantalum pentafluoride ($TaF_5$), niobium pentafluoride ($NbF_5$), mercuric fluoride ($HgF_2$), mercurous fluoride ($Hg_2F_2$), cupric fluoride ($CuF_2$), argentous fluoride ($AgF$), argentic fluoride ($AgF_2$) and bismuth trifluoride ($BiF_3$). The preferred metal fluorides are cobaltic trifluoride, manganese trifluoride, argentic fluoride and mercuric fluoride, with the most preferable being cobaltic trifluoride and manganese trifluoride.

It was unexpectedly found that when lead dioxide was mixed with a metal fluoride such as manganese trifluoride, cobaltic trifluoride or tantalum pentafluoride, and then used as a cathode in a cell employing a lead anode, a solid electrolyte of $88PbF_2\text{-}8SrF_2\text{-}4KF$, the open circuit voltage was higher than the open circuit voltage using either lead dioxide or the metal fluoride as the cathode in the cell system. Although not wanting to be bound by theory, a possible explanation of the synergistic effect of using lead dioxide together with the metal fluoride is that the water in the lead dioxide ($PbO_2$) reacts with the metal fluoride such as manganese trifluoride to produce hydrogen fluoride (HF) as follows:

$$2MnF_3 + 3H_2O \rightarrow 6HF + Mn_2O_3.$$

Hydrogen fluoride is then believed to take part in the overall cell reaction as follows:

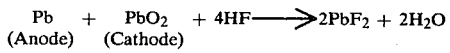

$$Pb + PbO_2 + 4HF \longrightarrow 2PbF_2 + 2H_2O$$
(Anode) (Cathode)

It has been reported in the art that lead dioxide always contains $Pb^{2+}$ and $OH^-$ ions as replacement for some $Pb^{4+}$ and $O^{2-}$ ions. Chemical analysis of alpha-$PbO_2$ (orthorhombic-columbite structure) and beta-$PbO_2$ (rutile) have been reported by N. E. Bagshaw, R. L. Clarke and B. Halliwell, in the Journal of Applied Chemistry, 16, P. 180 (1966) as follows:

TABLE I

Chemical analysis of Alpha-lead dioxide

| Preparation method | Lead, % | Oxygen % | Hydrogen % | Chemical Composition |
|---|---|---|---|---|
| Sodium chlorate-sodium nitrate oxidation | 86.60 | 13.17 | 0.057 | $PbO_{1.83}(OH)_{0.14}$ |
| Chlorine dioxide oxidation | 85.84 | 13.69 | 0.106 | $PbO_{1.81}(OH)_{0.26}$ |
| Ammonium persulphate oxidation | 86.19 | 13.70 | 0.095 | $PbO_{1.83}(OH)_{0.23}$ |
| Alkaline electro-formation | 85.89 | 13.05 | 0.068 | $PbO_{1.80}(OH)_{0.16}$ |
| Alkaline-lead acetate electrodeposition | 85.95 | 13.42 | 0.082 | $PbO_{1.82}(OH)_{0.19}$ |

TABLE II

Chemical analysis of Beta-lead dioxide

| Preparation method | Lead, % | Oxygen % | Hydrogen % | Chemical Composition |
|---|---|---|---|---|
| Lead tetra-acetate hydrolysis | 85.85 | 13.64 | 0.083 | $PbO_{1.86}(OH)_{0.20}$ |
| Nitric acid oxidation of minium | 85.54 | 13.35 | 0.045 | $PbO_{1.91}(OH)_{0.11}$ |
| Acid-electroformation | 85.69 | 13.67 | 0.106 | $PbO_{1.81}(OH)_{0.26}$ |
| Acid-lead perchlorate electrodeposition | 86.19 | 13.91 | 0.044 | $PbO_{1.98}(OH)_{0.11}$ |
| Acid-lead acetate electrodeposition | 85.60 | 13.85 | 0.073 | $PbO_{1.92}(OH)_{0.18}$ |

It has been observed that extreme drying of $PbO_2$ by long containment in a dry box of about 1 ppm $H_2O$ vapor apparently leads to sufficient dehydration to substantially interefere with the cell reaction, and then when mixtures of $MnF_3$ and this dry "$PbO_2$" are used as cathode materials, open circuit voltages of vanishingly small magnitudes are obtained that only slowly rise to 1.75 to 1.90 V. The attainment of the expected open circuit voltage value is accelerated by slight heating or by the addition of small amounts of water to the $PbO_2$ prior to mixing with $MnF_3$. It has been found that from about 0.4% by weight to as much as about 10% by weight water can be added and preferably between about 3% to about 6%. Lead dioxide having a water content of about 0.4 percent would have the following formula:

$$PbO_{1.79}(OH)_{0.2}\cdot 0.06H_2O$$

The cathode of this invention could be used with fluoride ion-conducting solid electrolytes, preferably $PbF_2$-based solid electrolytes. Examples of solid electrolytes for use in conjunction with the cathodes of this invention are as follows:

| Mixture Composition (Molar Proportions) | Specific Resistivity (ohm-cm) at Room Temp. |
|---|---|
| $86PbF_2\text{-}10CaF_2\text{-}4KF$ | 1578 |
| $81PbF_2\text{-}15CaF_2\text{-}4KF$ | 2750 |
| $76PbF_2\text{-}20CaF_2\text{-}4KF$ | 2200 |
| $71PbF_2\text{-}25CaF_2\text{-}4KF$ | 2500 |
| $66PbF_2\text{-}35CaF_2\text{-}4KF$ | 1730 |
| $61PbF_2\text{-}35CaF_2\text{-}4KF$ | 1800 |
| $79PbF_2\text{-}6KF\text{-}15SrF_2$ | 10778 |
| $77PbF_2\text{-}8KF\text{-}15SrF_2$ | 1736 |
| $75PbF_2\text{-}10KF\text{-}15SrF_2$ | 3000 |
| $86PbF_2\text{-}10BaF_2\text{-}4KF$ | 1100 |
| $81PbF_2\text{-}15BaF_2\text{-}4KF$ | 2800 |
| $76PbF_2\text{-}20BaF_2\text{-}4KF$ | 4400 |
| $71PbF_2\text{-}25BaF_2\text{-}4KF$ | 14000 |
| $66PbF_2\text{-}30BaF_2\text{-}4KF$ | 113000 |
| $61PbF_2\text{-}35BaF_2\text{-}4KF$ | 132000 |
| $56PbF_2\text{-}40BaF_2\text{-}4KF$ | 483000 |
| $86PbF_2\text{-}10SrF_2\text{-}4RbF$ | 2660 |
| $86PbF_2\text{-}10SrF_2\text{-}4KF$ | 1477 |
| $81PbF_2\text{-}15SrF_2\text{-}4KF$ | 2413 |
| $76PbF_2\text{-}20SrF_2\text{-}4KF$ | 3544 |
| $71PbF_2\text{-}25SrF_2\text{-}4KF$ | 9310 |
| $66PbF_2\text{-}30SrF_2\text{-}4KF$ | 26000 |
| $61PbF_2\text{-}35SrF_2\text{-}4KF$ | 70000 |
| $56PbF_2\text{-}40SrF_2\text{-}4KF$ | 269000 |
| $88PbF_2\text{-}8SrF_2\text{-}4LiF$ | 380000 |
| $88PbF_2\text{-}8SrF_2\text{-}4RbCl$ | 4100 |
| $76PbF_2\text{-}20CaF_2\text{-}4RbF$ | 5200 |
| $76PbF_2\text{-}20BaF_2\text{-}4RbF$ | 6500 |
| $81PbF_2\text{-}15SrF_2\text{-}4KBr$ | 5200 |
| $81PbF_2\text{-}15SrF_2\text{-}4K_2CO_3$ | 7100 |
| $81PbF_2\text{-}15SrF_2\text{-}4K_2SO_4$ | 8500 |
| $76PbF_2\text{-}20SrF_2\text{-}4KBr$ | 7500 |
| $76PbF_2\text{-}20SrF_2\text{-}4K_2CO_3$ | 9800 |
| $76PbF_2\text{-}20SrF_2\text{-}4K_2SO_4$ | 18400 |
| $96PbF_2\text{-}2CaF_2\text{-}2KF$ | 1326 |
| $94PbF_2\text{-}3CaF_2\text{-}3KF$ | 827 |
| $95PbF_2\text{-}2CaF_2\text{-}3KF$ | 766 |
| $94PbF_2\text{-}2CaF_2\text{-}4KF$ | 642 |
| $95PbF_2\text{-}3CaF_2\text{-}2KF$ | 1134 |
| $94PbF_2\text{-}1CaF_2\text{-}5RbCl$ | 3450 |
| $96PbF_2\text{-}2MgF_2\text{-}2KF$ | 3630 |
| $94PbF_2\text{-}1MgF_2\text{-}5KF$ | 2430 |
| $94PbF_2\text{-}2MgF_2\text{-}4KF$ | 1108 |
| $96PbF_2\text{-}2MgF_2\text{-}2K_2CO_3$ | 4400 |
| $94PbF_2\text{-}1MgF_2\text{-}5K_2CO_3$ | 1047 |
| $94PbF_2\text{-}1MgF_2\text{-}4K_2CO_3$ | 1161 |
| $88PbF_2\text{-}8MgF_2\text{-}4KF$ | 26400 |
| $86PbF_2\text{-}10MgF_2\text{-}4KF$ | 21900 |
| $76PbF_2\text{-}20MgF_2\text{-}4KF$ | 40200 |
| $88PbF_2\text{-}8SrF_2\text{-}4NaF$ | 20000 |
| $88PbF_2\text{-}8SrF_2\text{-}4RbF$ | 5700 |
| $88PbF_2\text{-}8SrF_2\text{-}4CsF$ | 63000 |
| $90PbF_2\text{-}5SrF_2\text{-}5KF$ | 848 |
| $88PbF_2\text{-}8SrF_2\text{-}2K_2CO_3$ | 1970 |
| $90PbF_2\text{-}8SrF_2\text{-}2K_2CO_3$ | 1202 |
| $86PbF_2\text{-}10CaF_2\text{-}2K_2CO_3$ | 1815 |
| $86PbF_2\text{-}10SrF_2\text{-}2K_2CO_3$ | 1405 |
| $96PbF_2\text{-}2Sr(NO_3)_2\text{-}2KNO_3$ | 1078 |
| $86PbF_2\text{-}10Sr(NO_3)_2\text{-}4KNO_3$ | 8290 |
| $86PbF_2\text{-}10SrF_2\text{-}4KNO_3$ | 1450 |
| 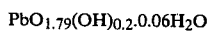$88PbF_2\text{-}8SrF_2\text{-}4KF$ | 857 |
| $90PbF_2\text{-}6SrF_2\text{-}4KF$ | 1034 |
| $94.5PbF_2\text{-}0.5CaSO_4\text{-}5.0KF$ | 1136 |
| $94.5PbF_2\text{-}0.5CaSO_4\text{-}5.0K_2CO_3$ | 1164 |
| $88PbF_2\text{-}8SrF_2\text{-}4K_2SO_4$ | 5700 |
| $88PbF_2\text{-}8SrF_2\text{-}4KNO_3$ | 1900 |
| $88PbF_2\text{-}8SrF_2\text{-}4KCl$ | 20000 |
| $88PbF_2\text{-}8SrF_2\text{-}4KBr$ | 2500 |
| $88PbF_2\text{-}8SrF_2\text{-}4K_2CO_3$ | 1700 |
| $88PbF_2\text{-}8BaF_2\text{-}4KF$ | 1050 |
| $88PbF_2\text{-}8BaF_2\text{-}4K_2SO_4$ | 5900 |
| $88PbF_2\text{-}4CaF_2\text{-}4SrF_2\text{-}4KF$ | 4000 |
| $88PbF_2\text{-}4CaF_2\text{-}4SrF_2\text{-}4K_2SO_4$ | 15600 |

| Mixture Composition (Molar Proportions) | Specific Resistivity (ohm-cm) at Room Temp. |
|---|---|
| $50PbF_2$-$50SnF_2$ | 1000 |

*The ionically conducting product formed from this ternary mixture was analyzed and found to contain the following: 78.63 wt. percent lead, 3.07 wt. percent strontium, 15.97 wt. percent fluorine and 0.60 wt. percent potassium.

Additional solid state electrolytes for use in conjunction with the cathode of this invention would include the ionically conductive product of a binary mixture of lead fluoride ($PbF_2$) and a range of between about 0.1 and about 15.0 mole percent of cesium fluoride or a metal salt having a cation component selected from the group consisting of sodium (Na), potassium (K), rubidium (Rb) and cesium (Cs) and an anion component selected from the group consisting of chloride, bromide, iodide, cyanide, nitrate, hydroxide, thiocyanate, carbonate, phosphate, sulfate, oxide, formate, acetate and oxalate.

The preferred solid electrolytes for use in conjunction with the cathodes of this invention are $88PbF_2$-$8SrF_2$-$4KF$, $86PbF_2$-$10BaF_2$-$4KF$, $94PbF_2$-$3CaF_2$-$3KF$, $95PbF_2$-$2CaF_2$-$3KF$, $95PbF_2$-$5KF$ and $50PbF_2$-$50SnF_2$.

Suitable anodes for use in conjunction with the cathode of this invention are lead, lead-coated substrates, alloys of lead and metals more nobel than lead.

DRAWINGS

Figure 2:
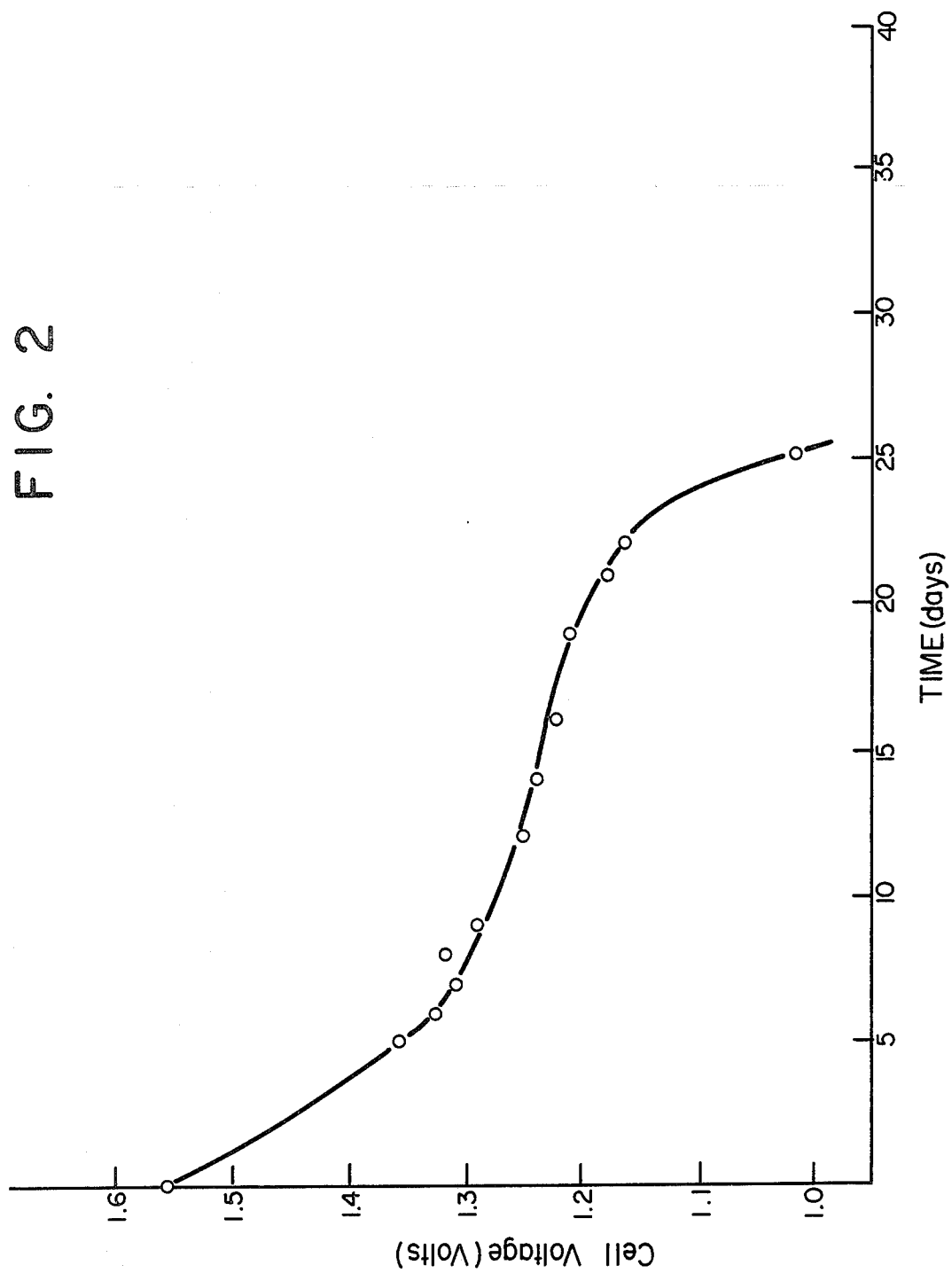

FIGS. 1, 2 and 3 are graphs illustrating the discharge characteristics of different cells made in accordance with this invention and as described in Examples I, II, and IV, respectively.

EXAMPLE 1

0.232 gram of cobalt trifluoride ($CoF_3$) was mixed with 0.245 gram lead dioxide ($PbO_2$) and then 0.150 gram of the solid electrolyte $88PbF_2$-$8SrF_2$-$4KF$ was added. The cathode so formed was used with a solid electrolyte $88PbF_2$-$8SrF_2$-$4KF$ and a lead disc (anode) to produce a solid electrolyte cell identified as cell A. Two additional cells of the same type were produced except that in the first of these cells, identified as cell B, only 0.116 gram of cobalt trifluoride was used and in the second cell, identified as cell C, 0.348 gram of cobalt trifluoride was used. The three cells were discharged across a 10-kilohm load and the data obtained are shown in FIG. 1. As evident from these data, the cathode of this invention can be used as a cathodic component for solid electrolyte cells.

EXAMPLE II 0.112 gram of manganese trifluoride ($MnF_3$) was mixed with 0.245 gram of lead dioxide and then 0.357 gram of the solid electrolyte $88PbF_2$-$8SrF_2$-$4KF$ was added. The cathode so formed was used with a solid electrolyte of $88PbF_2$-$8SrF_2$-$4KF$ and a lead disc (anode) to produce a solid electrolyte cell. The cell was discharged across a 300-kilohm load and the data obtained are shown plotted in the voltage vs. time curved in FIG. 2.

EXAMPLE III

Table 2 presents data showing various cathodes made in accordance with this invention and employed in cells along with a lead disc anode and a solid electrolyte $88PbF_2$-$8SrF_2$-$4KF$. Each of the cells so produced was discharged across a 100-kilohm resistor and the closed circuit voltage was observed. These data along with the open circuit voltage of each cell are shown in Table 2.

Table 2

| Cathode | Open Circuit Voltage (volts) | Closed Circuit Voltage (volts) |
|---|---|---|
| $AgF_2$—$PbO_2$* (1:1M) | 1.92 | 1.87 |
| $TaF_5$—$PbO_2$* (1:1M) | 1.91 | 1.85 |
| $MnF_3$—$PbO_2$* (1:1M) | 1.85 | 1.65 |
| $CoF_3$—$PbO_2$* (1:1M) | 1.95 | 1.88 |
| M = mole ratio | | |

*$PbO_2$ containing 0.4% $H_2O$.

EXAMPLE IV

Seven groups of cells containing various amounts of water were made. Each group consisted of three identical cells. Each cell contained a lead anode and an electrolyte layer composed of 88 mole % $PbF_2$, 8 mole % $SrF_2$, 4 mole % KF. The cathode of each cell contained 24.52% $MnF_3$, 23.08% of the above solid electrolyte, 2.00% Teflon powder binder and a quantity of $PbO_2$ and water which totaled 50.40%. The $PbO_2$ and $H_2O$ percentages are shown in Table 3. The $PbO_2$ had been exposed to a dry box atmosphere of less than one ppm water and had lost some of its water.

The average open circuit voltage of the three cells in each group is shown in Table 3. As can be seen, it is proportional to the amount of water contained in the cathode. Each cell was then heated for 20 minutes at 75° C., stored at room temperature for 20 hours, and again the average open circuit voltage of the three cells in each group was measured and is shown in Table 3.

Table 3

| Group | Percent of $H_2O$ Added $PbO_2$ | $H_2O$ | Average Open Circuit Voltage Initial | After Heating |
|---|---|---|---|---|
| A | 50.40 | 0 | 0.04 | 0.20 |
| B | 50.30 | 0.10 | 0.04 | 0.22 |
| C | 50.10 | 0.30 | 1.14 | 1.45 |
| D | 49.40 | 1.00 | 1.45 | 1.73 |
| E | 47.40 | 3.00 | 1.59 | 1.81 |
| F | 44.40 | 6.00 | 1.65 | 1.93 |
| G | 40.40 | 10.00 | 1.78 | 0.35 |

Two cells from Group E were discharged across a 100-kilohm resistor and the data so obtained are shown in FIG. 3.

It should be understood that the foregoing disclosure relates to preferred embodiments of the invention and it is intended to cover all changes and modifications of the invention which do not depart from the spirit and scope of the appended claims.

What is claimed is:

1. a cathode for use in an electrochemical cell comprising a mixture of lead dioxide ($PbO_2$) having a water content of between about 0.4 and about 10 percent by weight with a metal fluoride in a mole ratio of between about 3:1 and about 1:3.

2. The cathode of claim 1 wherein the mole ratio is about 1:1.

3. The cathode of claim 1 wherein the lead dioxide has a water content of between about 3 and about 6 percent by weight.

4. The cathode of claim 1 wherein the metal fluoride is selected from the group consisting of cobaltic trifluoride ($CoF_3$), lead trifluoride ($PbF_3$), manganese trifluoride ($MnF_3$), tantalum pentafluoride ($TaF_5$), niobium pentafluoride ($NbF_5$), mercuric fluoride ($HgF_2$), mercurous fluoride ($Hg_2F_2$), cupric fluoride ($CuF_2$), argentous fluoride ($AgF$), argentic fluoride ($AgF_2$) and bismuth trifluoride ($BiF_3$).

5. A solid electrolyte cell employing the cathode of claim 1.

6. The solid electrolyte cell of claim 5 employing a lead fluoride-based solid electrolyte.

7. The solid electrolyte cell of claim 6 wherein a portion of the lead fluoride-based solid electrolyte is incorporated into the cathode.

8. The solid electrolyte cell of claim 5 employing a solid electrolyte selected from the group consisting of $88PbF_2$-$8SrF_2$-$4KF$, $86PbF_2$-$10BaF_2$-$4KF$, $94PbF_2$-$3CaF_2$-$3KF$, $95PbF_2$-$2CaF_2$-$3KF$, $50PbF_2$-$50SnF_2$ and $90PbF_2$-$5SnF_2$-$5KF$ and an anode selected from the group consisting of lead, lead-coated substrates and lead alloys.

9. The solid electrolyte cell of claim 8 wherein a lead fluoride-based solid electrolyte is incorporated into the cathode.

10. The solid electrolyte cell of claim 5 employing a $88PbF_2$-$8SrF_2$-$4KF$ solid electrolyte and a lead anode.

11. The solid electrolyte cell of claim 5 employing a $50PbF_2$-$50SnF_2$ solid electrolyte and a lead anode.

12. The solid electrolyte cell of claim 5 employing a $86PbF_2$-$10BaF_2$-$4KF$ solid electrolyte and a lead anode.

13. The solid electrolyte cell of claim 5 employing a $94PbF_2$-$3CaF_2$-$3KF$ solid electrolyte and a lead anode.

* * * * *